United States Patent [19]

van der Lely et al.

[11] 4,444,270

[45] Apr. 24, 1984

[54] SOIL CULTIVATING IMPLEMENTS

[75] Inventors: Ary van der Lely, Maasland; Cornelis J. G. Bom, Rozenburg, both of Netherlands

[73] Assignee: C. Van der Lely N.V., Maasland, Netherlands

[21] Appl. No.: 352,173

[22] Filed: Feb. 25, 1982

[30] Foreign Application Priority Data

Mar. 3, 1981 [NL] Netherlands .................. 8101017

[51] Int. Cl.$^3$ .................... A01B 33/06; A01B 69/041; A01B 69/043

[52] U.S. Cl. ...................................... 172/47; 172/311; 172/443; 172/450

[58] Field of Search ...................... 172/47, 48, 59, 311, 172/456, 439–445, 446, 448, 450, 451, 70–72, 63

[56] References Cited

U.S. PATENT DOCUMENTS

| | | | |
|---|---|---|---|
| 2,599,617 | 6/1952 | Davis | 172/450 X |
| 2,701,509 | 2/1955 | Rolfes | 172/443 |
| 3,826,314 | 7/1974 | Lely et al. | 172/47 |
| 3,983,943 | 10/1976 | Lely | 172/47 |
| 4,073,346 | 2/1978 | Groth et al. | 172/451 X |
| 4,114,695 | 9/1978 | Lely | 172/47 |
| 4,148,363 | 4/1979 | Lely | 172/47 |
| 4,224,997 | 9/1980 | Lely | 172/59 |

FOREIGN PATENT DOCUMENTS

| | | | |
|---|---|---|---|
| 2621244 | 11/1977 | Fed. Rep. of Germany | 172/439 |
| 2840298 | 9/1978 | Fed. Rep. of Germany | 172/47 |
| 2834670 | 2/1979 | Fed. Rep. of Germany | 172/311 |

*Primary Examiner*—Paul E. Shapiro
*Attorney, Agent, or Firm*—Penrose Lucas Albright

[57] ABSTRACT

A soil cultivating implement of relatively large working width mounts a transverse row of rotary soil working members and the soil working members are carried in two side-by-side groups by corresponding substantially axially aligned hollow frame portions. Each soil working member is rotatable about an upwardly extending axis and directly connected to a power take-off of a prime mower. In order to enable the implement to tow a separate implement, a rear coupling structure is provided that includes rearwardly directed arms that are prevented from becoming bent, broken or otherwise damaged during use, and particularly during inoperative transport. The two frame portions are foldable upwardly and inwardly towards one another about pivots by hydraulic rams and a forward frame beam mounts a coupling trestle on a central beam portion. A carrying structure having rear coupling points is releasably interconnected to the trestle and secured in a relatively fixed position. Preferably, chains or other flexible but inextensible tie members link the arms to the carrying structure, link the arms to one anther, and also link the arms to the outer ends of upwardly tiltable outer frame portions that are pivoted to the central beam portion. The outer frame portions are each linked to a respective group of soil working members by parallelogram linkages.

11 Claims, 4 Drawing Figures

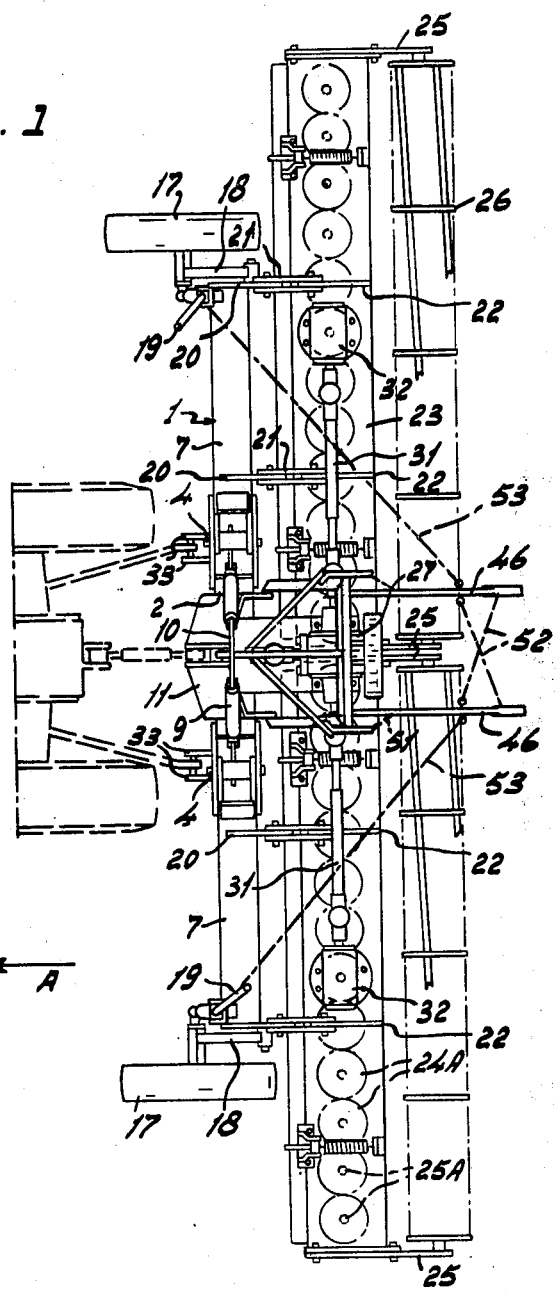

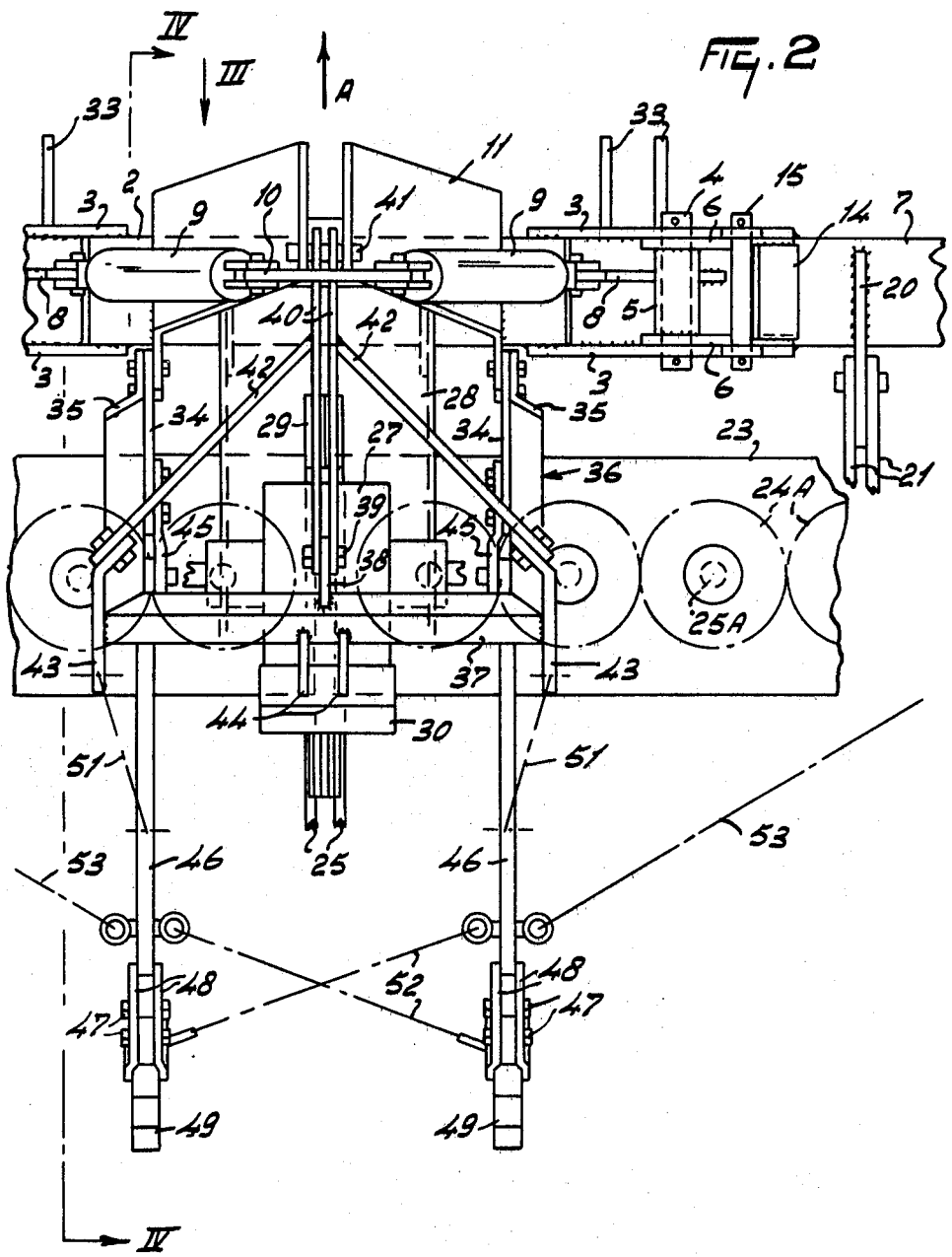

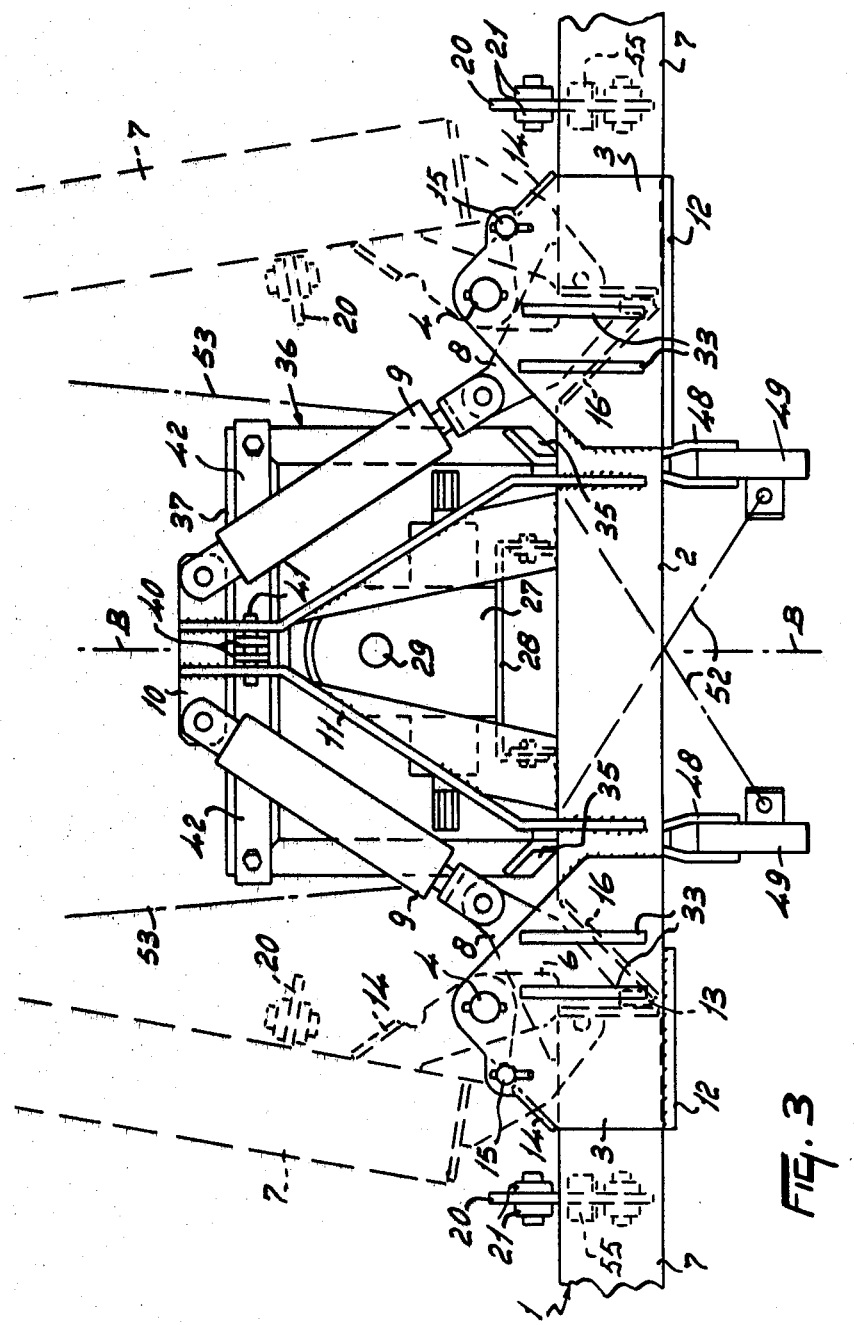

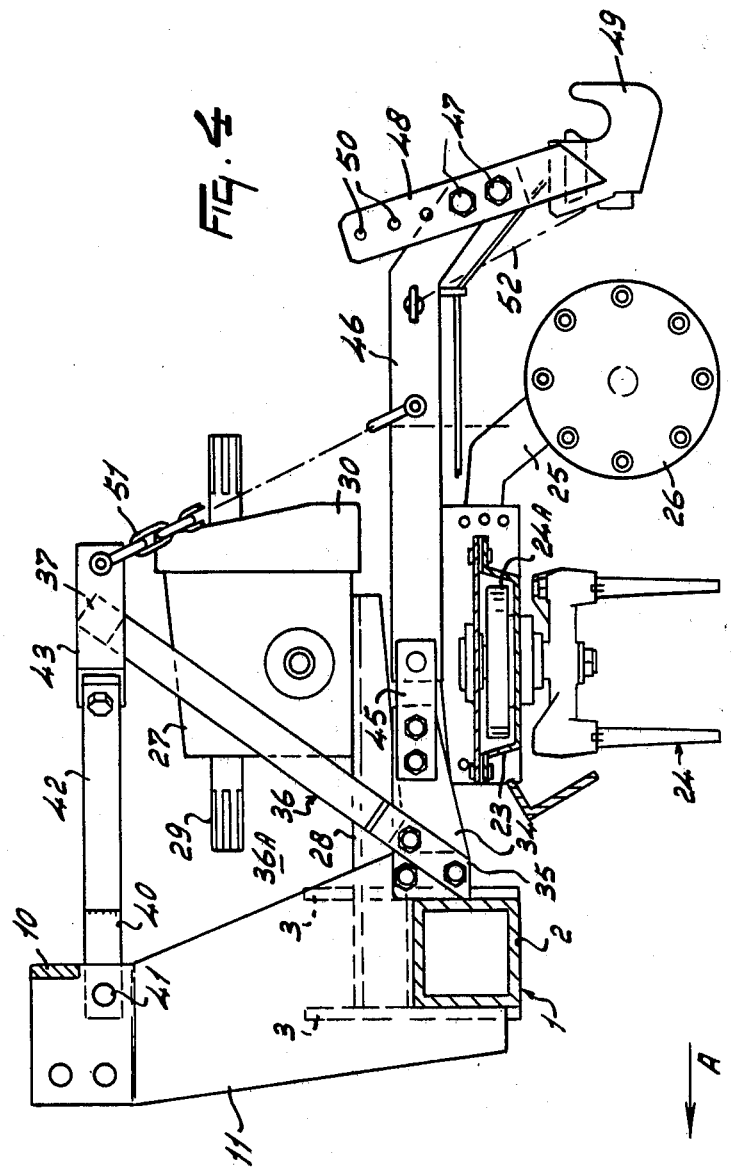

SOIL CULTIVATING IMPLEMENTS

SUMMARY OF THE INVENTION

This invention relates to soil cultivating implements or machines of the kind which comprise at least one elongate frame portion extending substantially horizontally perpendicular, or at least transverse, to the intended direction of operative travel of the implement or machine, the frame portion carrying a group of soil working members, the implement or machine also comprising a coupling member or trestle constructed and arranged for connecting the implement or machine to the three-point lifting device or hitch of a tractor or other operating vehicle and being provided with coupling means, at the rear thereof with respect to the intended direction of operative travel of the implement or machine, to enable a separate implement, machine, device or vehicle to be used in combination therewith or at least be moved over the ground thereby. "implement or machine" will be referred to as "implement" alone throughout the remainder of this document for the sake of brevity.

The rear coupling means in known implements of the kind set forth above often take the form of arms, rods or other parts that connect upper and lower locations at the rear of the coupling member or trestle to co-operating coupling points on the implement, machine or device which is to be used in combination with the soil cultivating implement, the arms, rods or other parts extending rearwardly over the frame portion and being pivotable, at least upwardly and downwardly, relative to the coupling member or trestle. This construction is satisfactory for some combinations of soil cultivating implements with other independent implements, machines or devices but, under some circumstances, and particularly when the soil cultivating implement has a relatively large working width, it has been found that the high laterally directed and other forces to which the known rear coupling means are subject bend, break or otherwise seriously or irreparably damage the arms, rods or other parts thereof, this damage being particularly likely to occur during inoperative transport when at least one unit of the combination is lifted clear of contact with the ground surface.

It is an object of the invention to overcome the difficulty discussed in the preceding paragraph, and particularly to provide a construction of the rear coupling means that will be highly resistant to bending and breakage when the soil cultivating implement of a combination has a relatively large working width. The invention accordingly provides a soil cultivating implement of the kind set forth, characterized in that the implement has a single frame beam which is located in advance of each group of soil working members with respect to the intended direction of operative travel of the implement, and in that the rear coupling means comprises a carrying structure releasably secured to the coupling member or trestle in a relatively fixed position.

For a better understanding of the invention, and to show how the same may be carried into effect, reference will now be made, by way of example, to the accompanying drawings, in which:

BRIEF DESCRIPTION OF THE DRAWINGS

FIG. 1 is a somewhat diagrammatic plan view of a soil cultivating implement in accordance with the invention shown connected to the rear of an agricultural tractor, FIG. 2 is a plan view, to an enlarged scale, illustrating a central region of the implement of FIG. 1 in greater detail, FIG. 3 is a front elevation as seen in the direction indicated by an arrow III in FIG. 2, and FIG. 4 is a section taken on the line IV—IV in FIG. 2.

DESCRIPTION OF THE PREFERRED EMBODIMENT

Referring to the accompanying drawings, the soil cultivating implement that is illustrated therein is in the nature of a rotary harrow and comprises a single main frame beam 1 which extends substantially horizontally transverse and usually, as illustrated, substantially horizontally perpendicular, to the intended direction of operative travel of the implement that is indicated in FIGS. 1, 2 and 4 of the drawings by an arrow A. The beam 1 is of hollow formation and has a rectangular cross-section which is preferably, as shown in FIG. 4 of the drawings, a square cross-section. The main frame beam 1 comprises a central portion 2, the opposite ends of which are symmetrically provided with pairs of cheek plates 3 that project generally upwardly and outwardly away from the central portion 2 with one cheek plate 3 at the front of said portion 2, with respect to the direction A, and the other at the rear thereof relative to the same direction. The shapes of the cheek plates 3 can be seen best in FIG. 3 of the drawings. The upper extremities of each pair of cheek plates 3 support corresponding pivot pins 4 that are substantially horizontally parallel to one another and to the direction A. Each pivot pin 4 is surrounded by a sleeve 5 (FIG. 2) to the opposite ends of which are rigidly secured corresponding lugs 6 so that said lugs 6 lie turnably alongside the facing surfaces of the respective pair of cheek plates 3, the pivot pin 4 concerned passing through holes in the lugs 6 that register with the ends of the associated sleeve 5. Each pair of lugs 6 is rigidly secured to the inner end of a corresponding outer tiltable portion 7 of the main frame beam 1 and it will be apparent from FIG. 3 of the drawings that, when the portions 7 are in alignment with the central portion 2 of the beam 1, the lugs 6 project upwardly and inwardly away from the inner ends of those portions 7 towards the respective pivot pins 4 that are then located at a higher horizontal level than is the whole of the main frame beam 1. The inner end of each outer tiltable portion 7 of the main frame beam 1 is also provided, between the corresponding pair of lugs 6, with a setting arm 8 that, as can be seen best in FIG. 3 of the drawings, projects upwardly and inwardly from said inner end towards a substantially vertical plane of substantial symmetry B—B of the implement that is parallel to the direction A, under conditions in which, as illustrated in full lines in FIG. 3, the two outer portions 7 of the frame beam 1 are in substantially horizontal alignment with the central portion 2 thereof.

Each setting arm 8 is of generally tapering shape in a direction away from the inner end of the tiltable portion 7 to which it is secured and the free end thereof is pivotally connected by a pin that extends substantially horizontally parallel to the direction A to a fork at the free end of the piston rod of a hydraulic piston and cylinder assembly or ram 9. A fork carried by the upper end of the cylinder of the assembly 9 is pivotally connected, by a further pin that extends substantially horizontally parallel to the direction A, to one end of a transverse bracket 10 mounted at the top of a generally triangular (as seen in front or rear elevation) coupling member or trestle 11 of the implement. The opposite end of the transverse bracket 10 co-operates with the piston and cylinder assembly or ram 9 that is arranged substantially symmetrically at the opposite side of the plane B—B. The coupling member or trestle 11 is at the front of the implement with respect to the direction A and its lower ends are fastened to the central portion 2 of the main frame beam 1. As can be seen best in FIG. 3 of the drawings, when the implement is viewed in a direction parallel to the direction A, the two hydraulic piston and cylinder assemblies or rams 9 extend alongside the upwardly convergent side surfaces of the coupling member or trestle 11 and are substantially parallel to those respective side surfaces when the pistons of the assemblies are withdrawn into their cylinders and the outer portions 7 of the main frame beam 1 are in substantially horizontal alignment with the central portion 2 thereof. The lower surfaces of each pair of cheek plates 3 are rigidly interconnected by a corresponding substantially horizontally disposed strip 12 that constitutes a stop preventing the corresponding outer beam portion 7 from turning downwardly about its pivot pin 4 beyond the position illustrated in full lines in FIG. 3 in which that outer portion 7 is in substantially horizontal alignment with the central portion 2 of the beam 1. It will be seen that, in this limit position, the lower surface of the beam portion 7 concerned bears against the upper surface of the strip 12. Stops 13 (FIG. 3) are also provided between each pair of cheek plates 3 and have flat surfaces which bear against end plates at the inner ends of the hollow beam portions 7 to reinforce the action of the stop strips 12 when said outer beam portions 7 are in the limit position that has just been described. The two lugs 6 of each pair are interconnected, for reinforcement purposes, by a corresponding strip 14 which is located alongside the upper surface of the respective tiltable beam portion 7. In order positively to maintain the outer beam portions 7 in the position shown in full lines in FIG. 3 of the drawings, which corresponds to a working position of the implement, upper inclined edges of the cheek plates 3 are formed with substantially horizontally aligned holes and upper edges of the lugs 6 are formed with semicircular recesses alongside the strips 14. The recesses register with the holes in the position under consideration and locking pins 15 entered through the holes, and thus into the intervening recesses, prevent significant tilting movements of the outer beam portions 7 about the pivot pins 4 relative to the central beam portion 2.

When the implement is in operation, the three portions 7, 2, 7 of the beam 1 are effectively united making the single main frame beam 1 substantially rigid throughout its length. The outer ends of the hollow central portion 2 of the beam 1 are bevelled and are closed by corresponding inclined end plates 16, said end plates 16 being parallel or substantially parallel to edges of the respective setting arms 8 that are inclined lower edges thereof when the outer arm portions 7 are in the position shown in full lines in FIG. 3. It will be noticed from the same Figure that, in the full line position just mentioned, the pivotal connections of the setting arms 8 to the free ends of the piston rods of the piston and cylinder assemblies or rams 9 are located at substantially the same horizontal level as are the two pivot pins 4 whereas, when the two beam portions 7 are tilted upwardly into the inoperative position that is shown in broken lines in FIG. 3, the pivotal connections of the setting arms 8 to said piston rods are located substantially, although not exactly, vertically beneath the respective pivot pins 4.

The outer end of each tiltable beam portion 7 that is remote from the plane B—B has a corresponding and preferably pneumatically tired ground wheel 17 (FIG. 1) connected to it. Each ground wheel 17 is freely rotatable and has its axle shaft secured to a corresponding arm 18 that is turnable upwardly and downwardly about a stub shaft mounted at the rear of the outer end of the beam portion 7 concerned so as to be parallel to the respective axle shaft. The front of that beam portion 7 is provided with an adjustment assembly 19 which is of a construction that is well known per se, the lower end of the adjustment assembly being connected to the axle shaft of the ground wheel 17 concerned in such a way that, by rotating a screw-threaded spindle of the assembly 19 in an appropriate direction, that axle shaft and its arm 18 can be turned either upwardly or downwardly relative to the main frame beam 1 so as effectively to lower or raise that frame beam relative to the ground surface when the wheels 17 are in contact therewith.

The top and rear, with respect to the direction A, of each tiltable outer beam portion 7 is provided, at locations very close to its inner end and at its outer end, with two supports 20 to upper and lower locations on which are pivotally connected, by corresponding pivot pins which extend parallel to the length of the portion 7 concerned, the ends of upper and lower pairs of arms 21, the two arms 21 of each pair being located at opposite sides of the support 20 concerned. The arms 21 of the upper and lower pairs are disposed substantially vertically above one another in the working position of the implement and all project generally rearwardly with respect to the direction A from the corresponding supports 20. The rearmost ends of these arms 21 are pivotally connected by corresponding pins to the opposite sides of further supports 22 mounted on the tops of two separate hollow box-section frame portions 23 of the implement which frame portions 23 are nevertheless substantially horizontally aligned in end-to-end relationship with one another in a direction that is substantially horizontally perpendicular, or at least transverse, to the direction A when the implement is disposed in its working position as shown throughout the drawings (except in broken lines in FIG. 3 thereof) and as referred to above. It will be apparent that one pair of supports 22 corresponds to the two supports 20 carried by one of the outer beam portions 7 while the other pair of supports 22 corresponds to the two supports 20 carried by the other outer beam portion 7 and that said supports 20 and 22, together with the intervening arms 21, constitute parallelogram linkages allowing the hollow frame portions 23 to move upwardly and downwardly relative to the main frame beam 1 without significant tilting.

A plurality, of which each frame portion 23 has twelve in the example that is being described, making a total of twenty-four, of upwardly extending (non-horizontal) and usually vertically or substantially vertically disposed shafts 25A are rotatably journalled in bearings carried by the upper and lower walls of each frame portion 23 so as to lie in corresponding rows that will effectively be a single row in the working position of the implement. The axes of rotation of the successive shafts 25A are spaced apart from one another at regular intervals which advantageously, but not essentially, have magnitudes of substantially twenty-five centimeters. The lowermost end of each shaft 25A projects downwardly from beneath the bottom of the hollow frame portion 23 concerned and is there firmly but releasably provided with a corresponding rotary soil working member 24 (FIG. 4). Each member 24 has a diametrically opposed pair of cultivating members in the form of rigid tines and the lowermost ends of the two tines of each member 24 are spaced apart from one another by a little greater distance than the spacing between the axes of rotation of immediately neighboring shafts 25A so that, during operation, the strips of land which are worked by the individual members 24 will overlap one another to produce a single broad strip of worked soil which, in the case of the example that is being described, will have a width of substantially, but not necessarily exactly, six meters so that the implement which is being described may justifiably be considered to be one having a relatively large working width. Each of the two frame portions 23 is provided alongside side plates which close those hollow ends with corresponding arms 25 that project rearwardly beyond the side plates with respect to the direction A and which are upwardly and downwardly turnable about strong pivot pins located at substantially the fronts of those side plates. In the working position of the implement, the strong pivot pins define a substantially horizontal axis that is parallel to the length of the aligned frame portions 23 and simple known means which is not the subject of the present invention but which is somewhat diagrammatically illustrated in FIG. 4 of the drawings is provided to enable each arm 25 to be firmly but releasably maintained in a selected one of a number of different angular settings about said substantially horizontal axis relative to the frame portion 23 concerned. The rearmost ends of the two arms 25 that correspond to each frame portion 23 lie behind the corresponding row of soil working members 24 with respect to the direction A and are enlarged as compared with the remainders of those arms, being orientated obliquely downwardly and rearwardly (see FIG. 4). Substantially the lowermost extremities of these rearward portions of each pair of arms 25 carry substantially horizontally aligned bearings between which an open-work ground roller 26 of skeletal formation is mounted in a freely rotatable manner. Each ground roller 26 comprises a central axially extending tubular shaft to which a plurality, such as five, of circular support plates are centrally secured at regularly spaced apart intervals, the skeletal curved ground-engaging surface of each roller 26 being afforded principally by a plurality, such as eight, of tubular or rod-formation elongate elements which are entered lengthwise through substantially circumferential holes in the roller support plates so as, preferably and as shown in outline in FIG. 1, to extend helically around the longitudinal axis of the roller concerned in regularly spaced apart relationship from one another. Despite the fact that the frame portions 23 and their soil working members 24 are upwardly and downwardly displaceable relative to the main frame beam 1, each roller 26 provides a maximum depth control function for the tines of the corresponding row of rotary soil working members 24 and serves, in its own right, as a soil working member to crush any lumps of soil exceptionally missed by the members 24 and to produce a gentle smoothing and levelling effect upon the surface of the ground that has immediately previously been dealt with by those members 24.

A support 28 projects rearwardly from the top of the central portion 2 of the main frame beam 1 at a location in the middle of that portion 2 and carries, on its upper surface, a central gear box 27 from which drive is transmitted to the two then aligned rows of rotary soil working members 24 when the implement is in use. The central gear box 27 comprises a splined or otherwise keyed rotary input shaft 29 which projects substantially horizontally forwardly therefrom in substantially the direction A to enable it to be placed in driven connection with the rear power take-off shaft of an agricultural tractor or other vehicle (FIG. 1) via a telescopic transmission shaft (not shown) that is of a known construction having universal joints at its opposite ends, such telescopic transmission shaft then passing, as will be apparent from FIG. 3 of the drawings, between the upwardly convergent side members of the coupling member or trestle 11. The central gear box 27 incorporates, at its rear, a change-speed gear which it is not necessary to describe in any detail for the purposes of the present invention. It suffices to say that a selected one of a number of pairs of intermeshing pinions of different sizes can be mounted in the change-speed gear 30 for co-operation with the splined or otherwise keyed ends of a pair of substantially horizontal shafts, one of which is the rotary input shaft 29, to enable the rotary soil working members 24 to be revolved at a faster or slower speed, as may be required, without having to change the initiating speed of rotation that is derived from the rear power take-off shaft of the operating agricultural tractor or other vehicle. The central gear box 27 has two output shafts which are substantially horizontally aligned in a direction that is perpendicular or substantially perpendicular to the direction A and these two splined or otherwise keyed output shafts, which may be the opposite ends of a single shaft, are driven from the rotary input shaft 29 via the change-speed gear 30 at a speed which is dictated by the setting adopted in the change-speed gear 30. The two rotary output shafts of the central gear box 27 are connected by telescopic transmission shafts 31 (shown only in FIG. 1 of the drawings), having universal joints at their opposite ends, to rotary input shafts of corresponding outer gear boxes 32. Each outer gear box 32 is mounted on a top cover plate of the corresponding hollow frame portion 23 above one of the center pair of soil working members 24 that corresponds to that frame portion 23. The shaft 25A which carries this soil working member 24 has an upward extension, through the top cover plate of the frame portion, into the corresponding outer gear box 32 and bevel pinions inside that gear box 32 place the rotary input shaft thereof in driving connection with the upwardly extended shaft 25A. Each rotary shaft 25A is provided, inside the corresponding hollow frame portion 23, with a respective straight-toothed or spur-toothed pinion 24A and the twelve pinions 24A, inside each hollow frame portion 23, are of such sizes that each of them has its teeth in mesh with those of its immediate neighbor or both of its immediate neighbors so that, during operation, each pinion 24A in the single row or train thereof that corresponds to the frame portion 23 concerned will revolve, together with the corresponding shaft 25A and soil working member 24, in the opposite direction to the or each immediately neighboring similar assembly. The soil working members 24 are so positioned on the lowermost ends of the shafts 25A that, during operation, immediately neighboring members 24 will not foul one another despite the fact that they are of greater working width than the spacing between the axes of rotation of immediately neighboring shafts 25A.

The leading cheek plate 3 of each of the two pairs thereof is provided with a pair of forwardly projecting, substantially vertically disposed and horizontally spaced apart lugs 33 which are arranged for connecting the free ends of the lower lifting links of the three-point lifting device or hitch of an agricultural tractor or other operating vehicle to the central portion 2 of the main frame beam 1 by way of substantially horizontally aligned pivots in the manner which is shown somewhat diagrammatically in FIG. 1 of the drawings. The free end of the upper adjustable-length lifting link of the same lifting device or hitch can be pivotally connected to the top of the coupling member or trestle 11 in a similar manner using one or the other of two horizontally aligned pairs of holes which are illustrated in FIG. 4 of the drawings. Two supports 34 (FIGS. 2 and 4) project substantially horizontally rearwards from lower rear regions of the coupling member or trestle 11, said supports 34 being firmly but releasably secured to those lower rear regions by bolts. Each support 34 has a corresponding lug 35 firmly but releasably bolted to it so as to occupy an upwardly and rearwardly inclined position (see FIG. 4) and, in turn, the lugs 35 carry a similarly inclined and generally rectangular bracket 36. An upper limb of the bracket 36 extends substantially horizontally perpendicular to the direction A at substantially the same horizontal level as the top of the coupling member or trestle 11 and affords a transverse carrier 37. An apertured anchorage lug 38 (FIG. 2) projects forwardly from the front of the transverse carrier 37 at the center thereof and a horizontal pivot bolt 39, passed through the aperture in the lug, turnably connects the rearmost ends of two strips 40 to opposite sides of the anchorage lug. The opposite leading ends of the two strips 40 are turnably connected by a horizontal pivot pin 41 to the top and rear of the coupling member or trestle 11 at a location beneath that of the transverse bracket 10. Rearwardly divergent struts 42 have their leading ends secured to the outer surfaces of the two strips 40 at locations spaced a short distance rearwardly from the pivot pin 41, the rearmost ends of the two struts 42 being firmly but releasably bolted to inclined portions of corresponding lugs 43 which are fastened to the opposite ends of the transverse carrier 37 of the bracket 36 so as to project both forwardly and rearwardly with respect to the direction A from said carrier 37. A central region of the rear of the carrier 37 is provided with a rearwardly projecting pair of apertured lugs 44 that are vertically disposed and horizontally spaced apart from one another by a short distance.

The rear ends of the two supports 34 have corresponding plates 45 firmly but releasably secured to them by bolts, said plates 45 projecting further rearwardly beyond the ends of the supports 34. Pivots that are substantially horizontally aligned in a direction which is perpendicular to the direction A turnably connect the leading ends of two arms 46 to the corresponding plates 45 and it will be seen from FIG. 4 of the drawings that the rearmost extremities of the two arms 46 are inclined downwardly and rearwardly relative to the direction A as compared with the remainders of those arms. The rear end of each arm 46 has a corresponding pair of carriers 48 releasably fastened to it by horizontal bolts 47 so that the two carriers 48 of each pair lie at opposite sides of the arm 46 concerned. The bolts 47 co-operate with selected pairs of holes 50 in each carrier 48 and it will be seen from FIG. 4 of the drawings that said carriers 48 can occupy one of several different positions of downward and rearward projection beyond the ends of the arms 46 by employing appropriate holes 50 to receive the bolts 47. The lowermost ends of the two carriers 48 of each pair hold, between them, a corresponding coupling hook 49 which includes a known form of latching device that can be operated from the agricultural tractor or other vehicle to which the implement is connected during its use in a manner that will be referred to again below.

Flexible but inextensible members that are preferably in the form of chains 51 (including shackles at each end thereof as illustrated in FIG. 4) interconnect the rearmost ends of the two lugs 43 that are located behind the transverse carrier 37 and anchorages (shackles) on the corresponding arms 46 that are located substantially midway along the lengths of said arms 46 with respect to the direction A. Further flexible but inextensible members that are preferably in the form of chains 52 interconnect anchorages on the arms 46 that are located immediately in advance of the downwardly directed rear end portions thereof and the hooks 49 which respectively correspond to the other one of the two arms 46 so that, as seen in either plan view (FIG. 1 or FIG. 2) or front elevation (FIG. 3), the two chains 52 cross one another at a location contained in, or very close to, the plane B—B. Still further flexible but inextensible members that are preferably in the form of chains 53 interconnect anchorages on the outwardly facing surfaces of the two arms 46, at locations registering with the anchorages for the chains 52, and corresponding lugs (not visible) that are located close to the bodies of the two adjustment assemblies 19 (see FIG. 1) at the ends of the two outer portions 7 of the main frame beam 1 which are remote from the plane B—B.

In the use of the implement that has been described, it occupies substantially the position that is shown throughout the drawings except in broken lines in FIG. 3 thereof. The lifting links of the three-point lifting device or hitch at the rear of the agricultural tractor or other vehicle that is employed to propel and operate the implement are connected to the lugs 33 and to the top of the coupling member or trestle 11 in the manner that has been described above and the rear power take-off shaft of the same tractor or other operating vehicle is placed in driven connection with the rotary input shaft 29 of the central gear box 7 by way of the previously mentioned known telescopic transmission shaft (not shown) which has universal joints at its opposite ends. Adjustments that may, if required, be made before work commences include operating the adjusting assemblies 19 to turn the ground wheels 17 bodily upwardly or downwardly relative to the main frame beam 1 and thus, in effect, lower or raise that main frame beam 1 relative to the ground surface, raising or lowering the rollers 26 relative to the corresponding hollow frame portions 23 by downward or upward angular adjustment of the arms 25 relative to those frame portions 23 to govern the maximum depth to which the tines of the rotary soil working members 24 can penetrate into the ground and increasing or decreasing the speed of rotation of the soil working members 24, in response to a substantially constant speed of rotation applied to the rotary input shaft 29, by employing an appropriate pair of toothed pinions in the change-speed gear 30. These adjustments will normally be made, in the light of experience, having regard to the nature and condition of the soil that is to be cultivated and to the maximum depth of cultivation that is required. As previously mentioned, the soil cultivating implement that has been described by way of example has a working width of substantially, although not necessarily exactly, six meters, the group or row of soil working members 24 that is carried by each hollow frame portion 23 having an individual working width of substantially three meters. Although the levels of the axes of rotation of the two ground rollers 26 relative to those of the corresponding group or row of soil working members 24 will normally be the same, it is noted that it would be possible, if required for unusual circumstances, to set the levels of the axes of rotation of the two rollers 26 in different positions relative to their corresponding rows or groups of soil working members 24 so that, during operation, the tines of one group or row of soil working members 24 would be able to penetrate in the ground to a greater depth than would the tines of the soil working members of the other row or group.

It wil be appreciated that the large working width of the implement makes it totally impractical to transport it along public roads and through most farm gateways and the like in its working position and, when such transportation is required, the implement is raised clear of the ground by appropriate operation of the three-point lifting device or hitch of the agricultural tractor or other operating vehicle to which it is connected, excessive downward displacements of the arms 21 of the parallelogram linkages being prevented, under these circumstances, by underlying stops 55 (FIG. 3). The locking pins 15 are then removed and the hydraulic piston and cylinder assemblies or rams 9, which are preferably double-acting, are connected to the hydraulic system of the associated agricultural tractor or other operating vehicle in such a way as to extend their piston rods from their cylinders. It is noted that the flexible ducts by which the assemblies or rams 9 are releasably connectible to the hydraulic system of the agricultural tractor or other operating vehicle via controls which are accessible from the driving seat of that tractor or other vehicle have been completely omitted from the accompanying drawings since they may be entirely conventional in nature and do not form the subject of the present invention. The extension of the piston rods of the assemblies or rams 9 from their cylinders causes the outer portions 7 of the main frame beam 1, together with the corresponding setting arms 8, to be tilted upwardly and inwardly towards the plane B—B about the respective pivot pins 4 through angles of approximately 100° each at which time the piston rods will be extended as far as possible so that no further tilting beyond the position shown in broken lines in FIG. 3 of the drawings is possible. A return from the upwardly tilted transport position to the working position of the implement is quickly and easily achieved by operating the assemblies or rams 9 so as to withdraw the piston rods thereof into their cylinders, subsequently replacing the locking pins 15 and lowering the three-point lifting device or hitch of the tractor or other operating vehicle to bring the implement back into contact with the ground surface.

A soil cultivating implement can often most advantageously be used in combination with an immediately following implement, machine or device such as, purely for example, a seed drill, planting machine or fertiliser distributor and it is occasionally convenient, to avoid having to make two journeys with a single tractor, to tow a wheeled vehicle behind the soil cultivating implement. Many such implements, machines or devices are provided with their own coupling members or trestles that are constructed for co-operation with three-point lifting devices or hitches and, to facilitate the combination of an implement, machine or device of this kind with the soil cultivating implement that has been described, it has rear coupling means comprising the upper pair of apertured lugs 44 and the lower horizontally spaced apart coupling hooks 49. The coupling means also comprises the bracket 36 which is part of a carrying structure 36A (FIG. 4) which is rigidly but releasably fastened to substantially the top and the bottom of the coupling member or trestle 11 by bolts. When an implement, machine or device that is to be used in combination with the soil cultivating implement that has been described has its own coupling member or trestle constructed for connection to a three-point lifting device or hitch, the upper coupling point thereof is connected by an upper link or rod to the lugs 44 while the lower coupling points will usually be directly connectible to the two hooks 49. It is noted that the upper coupling point which is afforded by the lugs 44 is further to the rear, with respect to the direction A, than are the releasable points of connection of the arms 46 to the supports 34 by way of the bolts fastening the plates 45 to those supports 34. When the implement, machine or device used in combination with the soil cultivating implement is a power-driven one that does not have its own engine, a forwardly projecting rotary input shaft thereof can be driven from a rearwardly projecting shaft of the central gear box 27 by way of a further intermediate telescopic transmission shaft of a construction that is known per se having universal joints at its opposite ends. The shaft that projects rearwardly from the central gear box 27 may conveniently be integral with the rotary input shaft 29 thereof and will therefore not be subject to any increase, or decrease, in speed that may be provided by adjustments in the change-speed gear 30.

Despite the large working width of the soil cultivating implement, the coupling means that are provided for using a rearwardly disposed implement, machine or device in combination therewith will not be so heavily loaded, during either working of the combination or inoperative transport thereof, that the arms 46, in particular, are likely to become bent or otherwise permanently damaged. It is the provision of the flexible but inextensible tie members that are preferably in the form of the chains 51, 52 and 53 which is principally responsible for this improved resistance to bending and other damage as compared with otherwise comparable known implement combinations.

Although it is preferred that the tie members should be in the form of chains, it will be realized that this is not absolutely essential and that alternative flexible but inextensible tie members such as steel cables or hausers may be employed as alternatives. When the implement is in its inoperative transport position, the chains 53 or alternative flexible but inextensible tie members extend upwardly and outwardly with respect to the plane B—B from the arms 46 to the outer ends of the beam portions 7 as shown diagrammatically in FIG. 3 of the drawings and this disposition is highly conductive to the stability of the implement when in its inoperative transport position. The upward and downward adjustability of the hook carriers 48 relative to the rear ends of the arms 46 facilitates matching the coupling members or trestles of implements, machines or devices to be used in combination with the soil cultivating implement and it will be remembered that each hook 49 incorporates a known form of latching device which can be actuated from the driving seat of the agricultural tractor or other vehicle which operates the implement by way of flexible cables extending through guide eyes. A short portion of one such cable and one of the guide eyes is shown beneath the arm 46 that is visible in FIG. 4 of the drawings but said cables and their guide eyes are otherwise omitted from the drawings to avoid unnecessary complication and since they do not form the subject of the present invention. It will be appreciated that, since the rear coupling means, and particularly the carrying structure 36A thereof, is releasably secured in position on the implement, it may, if desired, be entirely removed, when not required, merely by releasing appropriate bolts, disconnecting the chains 53 or other flexible but inextensible tie members from the outer ends of the beam portions 7 and temporarily removing the cables which connect the latching devices of the hooks 49 to the driving seat of the agricultural tractor or other vehicle which moves and operates the implement.

Although certain features of the soil cultivating implement described illustrated in the accompanying drawings will be set forth in the following claims as inventive features, it is emphasized that the invention is not necessarily limited to those features and that it includes within its scope each of the disclosed parts of the soil cultivating implement, insofar as patentably novel including that illustrated in the accompanying drawings, both individually and in various combinations.

Having disclosed our invention, what we claim as novel and to be secured by Letters Patent of the United States is:

1. A soil cultivating implement comprising a frame and a plurality of soil working groups being connected to a main beam of said frame, each group comprising an elongated frame portion that is interconnected to said beam and the latter being located in front of said frame portions with respect to the normal direction of travel, coupling means on said beam, said coupling means including a forward coupling trestle and a rear carrying structure that extends to the rear of said beam, said structure being releasably secured to said trestle with fastening means and including upper and two lower rear coupling points for connection to a three-point coupling member carried by an auxiliary implement, said two lower rear coupling points being on pivotal arms, said upper rear coupling point rigidly connected to transverse carrier means extending laterally above said pivotal arms, a plurality of flexible, but inextensible tie-members interconnecting said transverse carrier means of said upper rear coupling point with both said pivotal arms in an arrangement that at least two of said flexible tie-members cross one another when viewed in plan.

2. An implement according to claim 1 wherein said upper coupling point of said structure and said transverse carrier means are located further to the rear than are lower locations of the fastening means that releasably secures said structure to the trestle.

3. An implement according to claim 2, wherein said structure includes a bracket with limbs releasably secured to lower locations on said trestle, an upper limb of said bracket forming said transverse carrier and said carrier being located at substantially the same horizontal level as the top of said trestle.

4. An implement according to claim 3, wherein said pivotal arms are pivotally mounted at locations adjacent the limbs of said bracket.

5. An implement according to claim 4, wherein rear end portions of said arms mount coupling hooks and said hooks are adjustably displaceable upwardly and downwardly relative to said rear end portions.

6. An implement according to claim 5, wherein the rear end portions of said arms are downwardly bentover relative to the remainders of said arms and the lower rearmost ends of said tie-members are connected to said arms near said coupling hook.

7. An implement according to claim 1 wherein two of said tie members are anchored to each of said arms at a location substantially midway along their length.

8. An implement according to claim 1, wherein said beam comprises a central beam portion and outer beam portions having pivot connections to said central beam portion for tilting upwardly relative thereto, and each said pivotal arm is connected by a further corresponding flexible but inextensible tie member to a location adjacent the end of a respective one of the outer beam portions remote from said pivot connection thereof to said central portion.

9. A soil cultivating implement comprising a frame and a plurality of soil working groups being connected to a main beam of said frame, each group comprising an elongated frame portion that is interconnected to said beam and the latter being located in front of said frame portions with respect to the normal direction of travel, coupling means on said beam, said coupling means including a forward coupling trestle and a rear carrying structure that extends to the rear of said beam, said structure being releasably secured to said trestle with fastening means and including at least one rear coupling point for interconnecting an auxiliary implement to said trestle, said trestle being mounted on a cenntral portion of said main frame beam and the latter extending substantially horizontally transverse to the direction of travel, said beam comprising said central portion and corresponding outer beam portions having pivot connections to said central portion for tilting upwardly relative thereto, each said outer beam portion being linked to a corresponding said elongated frame portion, at least one said group of soil working members being mounted on each said frame portion to be rotatable about respective upwardly extending axes, said structure comprising pivotal arms forming two lower rear coupling points for the aforesaid auxiliary implement, each of said arms being connected by a corresponding flexible, but inextensible tie-member to a location adjacent the outboard end of a respective one of said outer beam portions remote from said pivot connection thereof to said central portion.

10. An implement according to claim 9, wherein said carrying structure has an upper rear coupling point which with said two lower coupling points are for connection to a three-point coupling member carried by the aforesaid auxiliary implement.

11. A soil cultivating implement comprising a frame and a plurality of soil working groups being connected to a main beam of said frame, each group comprising an elongated frame portion that is interconnected to said beam and the latter being located in front of said frame portions with respect to the normal direction of travel, coupling means on said beam, said coupling means including a forward coupling trestle and a rear carrying structure that extends to the rear of said beam, said structure being releasably secured to said trestle with fastening means and including two upper coupling means and two lower rear coupling points, said two upper coupling means spaced farther apart than said two lower rear coupling points, said two lower rear coupling points being on pivotal arms, first flexible, but inextensible tie members connecting each said upper rear coupling means with the nearest of said pivotal arms, second flexible but inextensible tie-members connecting each said pivotal arm forward of its said lower coupling point to the opposite said pivotal arm near its said coupling point in an arrangement that said second flexible tie-members cross one another when viewed in plan, each said first tie member connected to its said pivotal arm forward of such arm's said lower coupling point and extending in a direction generally away from the nearest said second tie-member as seen in plan.

* * * * *